Patented Feb. 25, 1936

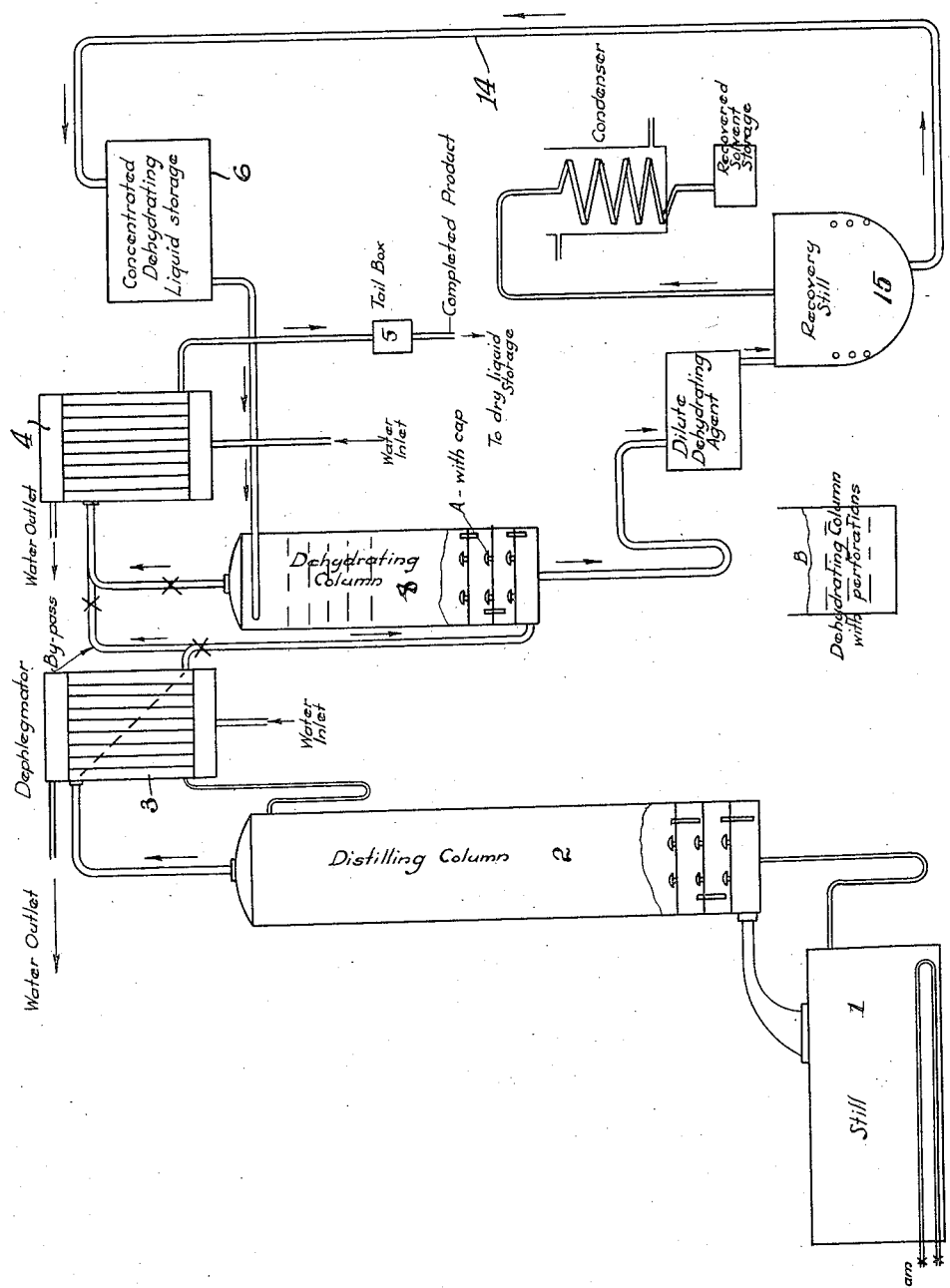

2,031,669

UNITED STATES PATENT OFFICE 2,031,669

ART OF DEHYDRATING ESTERS

Gustave T. Reich, Drexel Hill, Pa.

Application August 23, 1930, Serial No. 477,456

9 Claims. (Cl. 260—106)

The present invention is based on the discovery that the inorganic dehydrating materials used in dehydrating wet non-aqueous solvents can be commingled with the solvent when not in a fused or dehydrated form, and can be used in a form that is fluid, forming a more or less thick liquid, which may be a suspension carrying crystals, or a homogeneous liquid or another flowing form.

Organic liquids, especially those classified as solvents, hitherto have been dehydrated by distillation, by the application of azeo-tropic mixtures, or by a treatment with fused (non-aqueous) inorganic chemicals, that is, chemicals in a solid state, such as calcium chloride or similar materials, in a solid form.

Distillation of wet solvents or treatment with azeotropic mixtures, in order to obtain a dry solvent, requires an expensive plant. The treatment by fused (non-aqueous) inorganic materials is very simple if the inorganic materials used as dehydrating agents are not to be recovered. As these materials are valuable and also as they contain frequently substantial portions of the solvent, such a course is commercially impossible.

The ordinary course of treatment as practiced prior to my invention, of a wet solvent by fused inorganic materials to dehydrate it can be illustrated best by taking as an instance, a concrete example. 1,000 gallons of ethyl acetate was placed in a dehydrator, which was provided with a stirring device, to which was added 1,000 lbs. of fused (non-aqueous) calcium chloride ($Ca.Cl_2$), a solid material, which contains 75% of chloride and 25% water, and the whole was mixed for sufficient time, usually one to two hours. The mixture was then settled when it separated gravitationally into layers, usually two fairly well defined layers. The upper layer consisted of approximately 750 gallons of dry ethyl acetate (in a liquid state) and the lower layer of approximately 300 gallons of a liquid containing all the calcium chloride partly in water solution, partly combined with alcohol as alcoholate ($CaCl_2 3C_2H_5OH$)

and some ethyl acetate.

The economic impossibility of discarding this lower layer is apparent. This lower layer accordingly was then first distilled to drive off the alcohol and ethyl acetate in it, and some of the contained water; and then the remainder of this liquid layer consisting of calcium chloride and water was transferred to fusing pots and there heated to approximately 150° to 160° C. which would drive off all the water except the last 25% which is present in the solid fused calcium chloride, which was heretofore the finished dehydrating agent. This fused calcium chloride was then finely divided, usually by the use of a flaker and stored in air-tight containers until required again for dehydrating purposes, for it is very hydroscopic and likely to run or get lumpy.

The disadvantages of the use of a solid dehydrating agent are apparent. Among them may be mentioned; the process in which it is used cannot be continuous, an unnecessarily large amount of the solvents is removed with the dehydrating chemicals which have to be removed from them. The recovery of the dehydrating materials involves both distillation and fusion. A separate building is required distant from the rest of the plant and in the open; much power is consumed.

More labor is needed than in my process; the dehydrating agent must be protected in air-tight containers, being hygroscopic. If exposed to the air, it is likely to run or to form lumps, and hence is inconvenient to handle.

I have discovered that the use of the inorganic dehydrating material in a fused (nonsolid) state is not necessary, and that by employing my process just as efficient a dehydration of the solvent can be accomplished by using this material in an aqueous solution or suspension. I have found also by using the dehydrating material in an aqueous solution or suspension a much smaller portion of the solvent comes off with the dehydrating material and that this is especially the case where calcium chloride is used as the dehydrating agent. The dehydrating agents that are appropriate for use with each particular solvent are well known, and these dehydrating agents do not differ in my process from those used in the fused state. They are used in my process in aqueous suspension instead of in a fused state. A number of the usual dehydrating agents may be used with the same solvent, and different solvents may be treated with different dehydrating materials.

I will first describe wherein my process essentially consists and state the general conditions governing the carrying out of my process. I will then describe in detail the particulars of my process with a single dehydrating material, for instance, calcium chloride.

My process is independent of the particular instrumentalities used in the plant in which it is carried out, and the mechanical apparatus described as suitable to carry it out. It comprises the steps of mingling with the wet solvent, an aqueous solution of the dehydrating agent, which may however carry in suspension in it, crystals of such small size as do not interfere substantially with its flowing condition. The solvent must be a liquid, as is also the mixture of solvent and dehydrating solution. The dehydrating agent is a solution of an inorganic dehydrating material that dissolves in but does not combine chemically with the water in which it is dissolved.

The mixture of wet solvent and solution of dehydrating material is kept in my process at a temperature below that at which the solvent being dehydrated volatilizes. By far the greater portion of the solvent should be separated directly as a liquid, as this avoids complications and waste, which contain substantially nothing but the dehydrated solvent. Of course, in speaking of a dehydrated solvent, this does not mean a solvent in which no water exists but what is known in the arts as a dehydrated solvent, which contains a very small percentage of water.

My process is completed by the concentration of the dehydrating solution which has been diluted by the water taken by it from the wet solvent to its original concentration. The water it has collected is evaporated. The amount of the solvent it collected (if my process is properly carried out this need not be large) is separated. These two steps are carried out in practice by distilling off the solvent, and continuing the distillation until enough water has been removed to bring the solution of the dehydrating material back to its original concentration. It can then be reused. I insert here a table of some of the different dehydrating materials that I have found can be applied successfully to dehydrate solvents, the approximate concentrations, in degrees Baumé at which they may be used, and such remarks as may be helpful in understanding them.

| Solvent | Dehydrating agent | Temperature | Concentration, degrees |
|---|---|---|---|
| | | °C. | Bé. |
| Ethyl acetate | Calcium chloride | 20 | 45 |
| Cellosolve acetate | Aluminum chloride | 15 | 37 |

Assuming it is desired to dehydrate an organic liquid by my process,

The dehydration of the solvent may be carried out by treating it with a predetermined amount of liquid solution of the inorganic dehydrating material, or the process may be and preferably is a continuous one, carried out as described below.

The liquid dehydrating material may be used hot, or it may be cooled, but preferably cooled so that small crystals are formed, being then in a flowing state. In either condition it can be used in a continuous process. Whether used hot or cold, and whether freely or difficultly flowing, an effective dehydration is secured. The best concentration of the dehydrating material as well as its temperature depends largely upon the volatility of the organic liquid (the solvent) to be dehydrated. It must flow freely and must not make or allow the mixture to be hot enough to volatilize the solvent. A table showing suitable conditions for the use of calcium chloride as a dehydrator with a few of the various solvents is here inserted.

| Solvent | Temperature of volatile |
|---|---|
| | °C. |
| Ethyl acetate | 77.15 |
| Ethyl acetate | 77.15 |
| Cellosolve | 132.5 |
| Cellosolve | 132.5 |

| Physical concentration CaCl₂ | Temperature of CaCl₂ |
|---|---|
| | °C. |
| Liquid | 50 |
| Liquid and crystals | 20 |
| Liquid | 70 |
| Liquid and crystals | 20 |

In case of the dehydration of an organic liquid that volatilizes at a low temperature, I use the liquid dehydrating material at a temperature low enough not to volatilize the solvent.

Describing now the dehydration of a wet solvent by a continuous process:—

Fig. 1 is a diagrammatic sketch of a series of devices useful in practicing my process. The solvent may be produced by heating the alcohol and acetic acid or other suitable material in the still 1 with a catalyst if desired. It then passes into the esterification column 2, and the dephlegmator 3, and be condensed and collected for dehydrating in a suitable receptacle for receiving the wet solvent. This is merely an illustration of a way of producing a solvent. My process takes up the wet solvent at this point, and the method of producing this wet solvent is no limitation on my invention. The wet solvent and the liquid dehydrating material meet and commingle in the dehydrator 8. In my process the solvent flows off from the dehydrating column 8 in a completely dehydrated condition, in which condition it is received by the cooler 35 in which it is cooled and, passing through a tail box 5, is discharged as a completed product. No distillation of this solvent is necessary. The dehydrating agent passes downward through the dehydrating column 8, coming from the concentrated dehydrating liquid storage tank 17 to the upper part of the dehydrating column and exiting at the lower end of the dehydrating column 8. A main feature of my invention is the dry solvent is produced directly in a condition not requiring any distillation and preferably in liquid form by this counterflow of aqueous solvent and liquid dehydrating material. In practice, they pass through the dehydrator in counter-current. The wet solvent, being of less specific gravity than the dehydrating material, is forced into the bottom of the dehydrator 8, very conveniently by means of the pipes 30 and 31 and the pump 7. It then being lighter rises, through the dehydrating material that is entered into the top of the dehydrator 8. The dehydrating material is shown as being driven through pipes 33 and 34 by a pump 10, from a storage tank 9. The dry organic liquid dehydrated rises to the top of the dehydrator 8, and flows off through a suitable pipe 32. The dehydrating agent is at its highest concentration as it enters the tank 6.

It becomes greatly diluted as it sinks toward the bottom of the dehydrator 8, when it passes off spent from the dehydrator, 8, it is greatly diluted, and contains 30 to 70% of solvents; it passes through the pipe 14 and is treated to remove the excess water, which is wasted and to separate and collect the solvent that had come off with it from the dehydrator 8, leaving the dehydrating material sufficiently free from water (sufficiently concentrated) to operate when introduced into the dehydrator, 8, upon the wet solvent.

The means that I employ in practice to remove this excess of water and to fractionate it out from the solvent, is a batch still 15, into which the wet dehydrator is led. In this still the water is evaporated and the solvent that has been carried off from the dehydrator, 8, with the dehydrating material passes off dry through the pipe, 36, to the condenser 16, and thence to a suitable storage tank. The dehydating material, freed from excess of water, passes through the pipe 35 to a storage tank 9. The whole system, as above described, is continuous, and the rate at which the dehydration proceeds is regulated by the rate by which the wet organic liquid is produced.

The dehydrating material that I use most commonly in practice is calcium chloride ($CaCl_2$). This material can be used hot or warm, in case the solvent does not volatilize readily, and is cold in case of a solvent that volatilizes at a lower temperature. When used cold, the concentration should be about 45° Baumé (40°–48° Baumé) and the calcium chloride should be agitated while being cooled to form a flowing mass of small crystals in suspension. The concentration of other dehydrating materials is indicated in the tables and temperatures are indicated by the vaporization point of the wet solvent.

The dehydrator may consist of a long column filled with coke, baffle plates or other arrangements, depending upon the speed of the dehydration, and the difference of the specific gravities of the wet solvent and the dehydrating material. Many other mechanical means may be used to commingle the dehydrating material and to collect them separately and bring back the dehydrating material to the requisite degree of concentration and free it from the solvent collected by it (my invention lying, chiefly, in the use of the liquid or semi-liquid dehydrating material in place of the anhydrous or fused dehydrating material). For this reason, my invention is not limited to less than is covered by a fair reading of the claims, in view of the entire specification.

I claim:

1. The process of dehydrating wet esters of organic acids which comprises passing said wet esters in a liquid state in countercurrent through a solution of a dehydrating salt.

2. The process of dehydrating wet esters of organic acids which comprises intimately commingling said wet esters in liquid state with a saturated solution of a dehydrating salt, whereby the salt solution withdraws the water from the said wet ester and becomes diluted, and separating the dry ester from the salt solution.

3. The process of dehydrating wet esters of organic acids which comprises passing said esters in liquid state in countercurrent through a solution of a dehydrating salt which contains fine, undissolved particles of said salt, whereby the said solution withdraws water from the said ester, and separating the resulting dry ester from the salt solution.

4. The process of dehydrating wet esters of organic acids which comprises passing said esters in liquid state through a solution of calcium chloride having a density of 40° to 50° Baumé, whereby the said solution withdraws water from the wet ester and becomes diluted, and separating the dry ester from the solution.

5. The process of dehydrating wet ethyl acetate which comprises passing it in a liquid state in countercurrent through a concentrated solution of a dehydrating salt, whereby the said solution withdraws water from said ethyl acetate and becomes diluted, and separating the ethyl acetate from the diluted solution.

6. The process of dehydrating wet ethyl acetate which comprises passing it in a liquid state through a concentrated solution of a dehydrating salt, in countercurrent, whereby the said solution withdraws water from said ethyl acetate and becomes diluted and separating the ethyl acetate from the diluted solution.

7. The process of dehydrating wet cellusolve acetate which comprises passing it in a liquid state through a solution of a dehydrating salt, in countercurrent, whereby the said solution withdraws water from said cellusolve acetate and becomes diluted, and separating the cellusolve acetate from said diluted solution.

8. The process of dehydrating wet esters of organic acids which comprises passing said wet esters in liquid state in countercurrent through a concentrated solution of a dehydrating salt, and separating the dried ester from said solution, both ester and solution having temperatures below the boiling point of the ester.

9. The process of dehydrating wet esters of organic acids which comprises passing said esters in liquid state in countercurrent through a solution of calcium chloride which has finely divided undissolved particles of calcium chloride therein, whereby the said solution withdraws water from the said ester and becomes diluted, and separating the dry ester from the solution.

GUSTAVE T. REICH.